United States Patent [19]

Yamada et al.

[11] Patent Number: 4,630,112
[45] Date of Patent: Dec. 16, 1986

[54] DESCRAMBLING APPARATUS FOR A TELEVISION SIGNAL

[75] Inventors: Jun Yamada; Takeshi Murakami; Akitsuna Yuhara; Norio Hosaka; Yuji Fujita, all of Yokohama, Japan

[73] Assignee: Hitachi, Ltd., Tokyo, Japan

[21] Appl. No.: 553,237

[22] Filed: Nov. 18, 1983

[30] Foreign Application Priority Data

Nov. 24, 1982 [JP] Japan .................. 57-204636

[51] Int. Cl.⁴ .................. H04N 7/167; H04N 7/16; H04K 1/00
[52] U.S. Cl. ........................... 358/120; 358/114
[58] Field of Search .............. 358/114, 120; 333/196

[56] References Cited

U.S. PATENT DOCUMENTS 3,663,899 5/1972 Dieulesaint et al. .............. 333/196
4,295,155 10/1981 Jarger et al. .................. 358/120
4,396,946 8/1983 Bond .......................... 358/120

Primary Examiner—Stephen C. Buczinski
Assistant Examiner—Melissa L. Koltak
Attorney, Agent, or Firm—Antonelli, Terry & Wands

[57] ABSTRACT

In an apparatus for descrambling a scrambled television signal, an elastic surface wave filter is used. This elastic surface wave filter has an interdigital electrode having an electrode pattern similar to at least portion of the waveforms of a luminance signal section of the scrambled television signal to be input. The elastic surface wave filter generates a response pulse only when the waveforms which are analogous to the electrode pattern of the interdigital electrode of the scrambled television signal were input, thereby descrambling the television signal using this response pulse.

4 Claims, 8 Drawing Figures

DESCRAMBLING APPARATUS FOR A TELEVISION SIGNAL

BACKGROUND OF THE INVENTION

The present invention relates to a descrambling apparatus which is used for a CATV (community antenna television or cable television).

At present, as a new broadcasting service, a television broadcast using cables as a transmitting medium (CATV) is widespread. In this type of broadcast, the service is provided to only specific contractors (i.e. CATV subscribers); therefore, a particular modulation (this is called a scramble) is performed on the television signal to be transmitted at the side of the transmitting station of the television signal so that the non-contractors cannot receive this broadcast, thereby preventing reception of the television signal by the non-contractors. Each contractor has a descramble apparatus for descrambling the scrambled waveforms, so that he can receive the CATV service. The present invention relates to such a descrambling apparatus.

FIG. 1 is a schematic diagram illustrating the waveforms of the ordinary television signal which is not scrambled, in which the transverse axis indicates time and the vertical axis represents the signal amplitude level.

The waveforms shown in FIG. 1 are the waveforms to which amplitude modulation was performed using the RF signal as a carrier wave, and a video signal consists of a video information signal section and a blanking signal section. A synchronizing signal S is added to the blanking signal section.

When the receiver receives such a television signal, it detects the envelope of those waveforms, thereby enabling the sync signal S whose level is higher than the level of the blanking signal section to be easily extracted. In this way, the correct reception of the video signal can be performed.

In case of CATV, if the television signal having such waveforms as shown in FIG. 1 is transmitted as it is from the broadcasting station, anybody as well as non-contractors can receive it; therefore, this method disadvantageously departs from the inherent requirement of CATV that the services are provided to only the contractors. To solve such a problem as mentioned above, the broadcasting station of the CATV transmits the television signal having particular waveforms which were scrambled in such a manner that ordinary receivers cannot easily separate the sync signal S and, accordingly, they cannot receive the accurate video signal, and each contractor has a special apparatus for descrambling such scrambled waveforms, thereby enabling the correct reception of the television pictures.

FIG. 2 is a schematic diagram showing the scrambled waveforms of a television signal to be used in a conventional scrambling/descrambling method, which is called a pilot carrier method. Such a method has been employed in the products by Hamlin International Corp., such as CATV converters MODEL MCC-4000-P, MCC-3000-P, SPC-4000-P and SPC-3000-P (1978).

In contrast to the waveforms shown in FIG. 1, the waveforms shown in FIG. 2 are the waveforms having a pilot signal PS which has a special frequency spectrum different from that of the carrier waves (this is referred to as a video carrier) on which the video signal is added and whose amplitude level is slightly lower than that of the blanking signal, and this pilot signal PS is interposed as the sync signal S between the blanking and video information signal sections.

One or more number of, or any number of pilot signals may be used as the sync signal. In this type of scrambled waveform, which is different from the standard waveform of FIG. 1, since the frequency band of the pilot signal PS is different from that of the video carrier by using for example another channel, the necessary frequency band becomes wide, so that the frequency band which is about twice that of one channel as required in the case of the waveforms of FIG. 1 is needed as the band for one channel.

FIG. 3 is a circuit diagram showing a descrambling apparatus for the scrambled waveforms according to the pilot carrier method shown in FIG. 2. In the diagram, a reference numeral 1 denotes a band pass filter (BPF) to pass only the video carrier frequency band; 2 is a primary mixer circuit; 3 is a primary local oscillator; 4 is an IF band pass filter; 5 is an amplifier; 6 is a secondary mixer circuit; 7 is a secondary local oscillator; 8 is a modulator; 9 is a BPF to pass only the frequency band of the pilot signal; 10 is an amplifier; 11 is a detector; and 12 is a Schmitt trigger circuit (which has a certain threshold value and when the input signal level exceeds this threshold value level, it outputs an output signal). The upper route consisting of the circuit blocks 1 to 8 indicates the ordinary route for processing the received television signal, while the lower route consisting of the circuit blocks 9 to 12 represents the route for extracting the sync signal S (i.e. pilot signal PS) from the received television signal.

The operation of the circuit of FIG. 2 will now be described. Such scrambled waveforms as shown in FIG. 2 (however, in this case, it is assumed that only one pilot signal PS is shown) are input to an input terminal IN. Since the BPF 1 passes only the video carrier frequency band (RF frequency), the pilot signal PS has been eliminated from the output of the filter 1. This output (the blanking and video information signals on the video carrier) of the BPF 1 is frequency converted by the primary mixer circuit 2 and local oscillator 3 and the beat-down is performed to obtain the IF frequency. Then, the signal passes through the IF band pass filter 4, where the levels of the video information and luminance signals (and further the audio signal) are adjusted. After they have been amplified by the amplifier 5, the output is again frequency converted into the RF frequency by the secondary mixer circuit 6 and local oscillator 7, and is input as a modulated signal to the modulator 8.

On the other hand, the pilot signal PS (sync signal) is extracted from the scrambled waveforms input to the input terminal IN by the BPF 9, this pilot signal PS is amplified by the amplifier 10, thereafter it is detected by the detector 11. After the level of the detection output has been set into a proper level by the Schmitt trigger circuit 12, it is input as a modulation signal to the modulator 8. In the modulator 8, the modulation is executed to a the blanking signal (and the video information signal) on the video carrier of the RF frequency as waves to be modulated using the detection output of the pilot signal PS as modulation waves, thereby outputting such waveforms thus descrambled as shown in FIG. 1 from an output terminal OUT.

The above is the description of conventional scrambled waveforms and the descrambling apparatus to descramble those waveforms. However, as already described, with such a conventional pilot carrier scrambling method, there is a drawback in that it is difficult to realize the multichannel in the broadcasting channel since the necessary frequency band becomes wide.

SUMMARY OF THE INVENTION

The present invention was made to improve such a drawback in the prior technology as mentioned above, and it is an object of the invention to provide a descrambling apparatus for use in the CATV in which the necessary frequency band can be preferably set to be narrow and there is no limitation to realize the multichannel in the broadcasting channel due to this point of view.

One feature of the present invention is that in a descrambling apparatus, there is provided filter means for generating a response signal only when at least a portion of the waveforms having a particular shape or envelope which cyclically occur in the scrambled television signal to be input was input, and that the descrambling for the television signal is performed using this response signal. In a preferred embodiment of the present invention, as the above-mentioned filter means, there is included an interdigital electrode having a pattern shape similar to at least a portion of the above-mentioned waveforms with the particular shape or envelope in the scrambled television signal, and there is provided an elastic surface wave filter to output a response signal only when the waveforms of the particular shape or envelope are input.

BRIEF DESCRIPTION OF THE DRAWINGS

FIG. 4b is a diagram showing the impulse response waveforms in the interdigital electrode having such an electrode pattern as shown in FIG. 4a.

DESCRIPTION OF THE PREFERRED EMBODIMENT

Prior to describing an embodiment of the present invention, the typical characteristics of an elastic surface wave filter will be first described hereinbelow with reference to FIGS. 4a and 4b for easier understanding of the present invention.

Figure 4A:
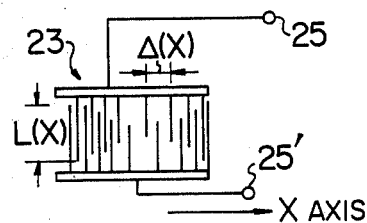
FIG. 4a is a schematic diagram showing an example of general electrode patterns of an interdigital electrode.

As can be seen in FIG. 4a, the interdigital electrodes are formed on a piezoelectric substrate in such a manner that the cross width L(X) of opposing electrode fingers of an interdigital electrode 23 changes as a function of a distance in the X-axial direction and that its cycle is Δ(X). When an electrical impulse is input through terminals 25 and 25' to this electrode 23, elastic surface waves W such that the amplitude is approximately proportional to L(X) and the frequency is inversely proportional to Δ(X), i.e. such as shown in FIG. 4b are generated.

Figure 4B:

When comparing FIGS. 4a and 4b, it will be appreciated that there is a similarity between the waveforms of the elastic surface waves W shown in FIG. 4b and the shape of the electrode pattern of the interdigital electrode 23 shown in FIG. 4a.

On the contrary, it is also possible to output the electric signal of the impulse waveforms from the terminals 25 and 25' by inputting the elastic surface waves W having such waveforms as shown in FIG. 4b to the interdigital electrode 23 having such an electrode pattern as shown in FIG. 4a formed on the piezoelectric substrate.

In this embodiment of the present invention, by utilizing the above-described facts, there is provided an elastic surface wave filter which has an interdigital electrode having the pattern shape similar to at least a portion of the scrambled waveforms, thereby performing the descrambling operation using the impulse response signal which is obtained only when the scrambled waveforms were input to this filter.

Figure 5:
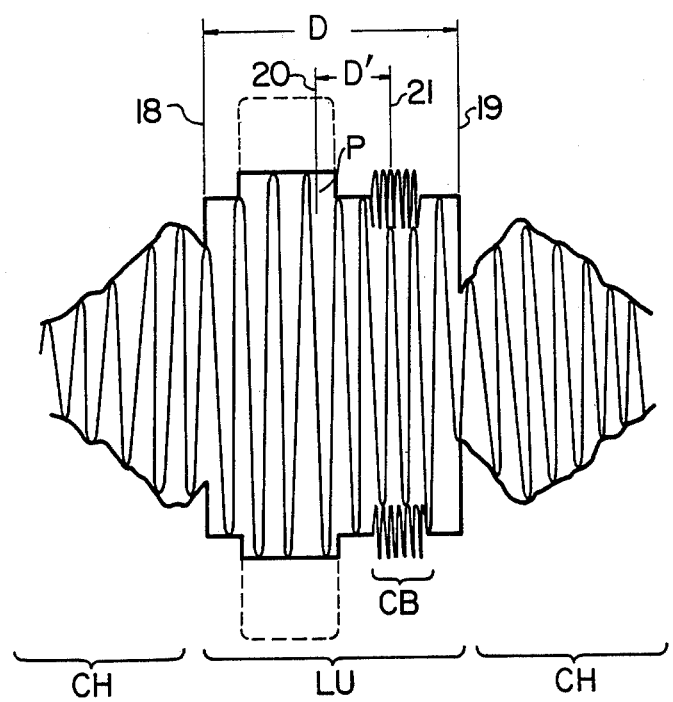
FIG. 5 is a diagram showing an example of the waveforms of the scrambled television signal to be used in a descrambling apparatus according to the present invention.

FIG. 5 shows an example of the waveforms of the scrambled television signal to be input to the descrambling apparatus of the present invention. In the drawing, the blanking signal section of the scrambled television signal includes a color burst section CB and a residual basic section P of the sync signal of which the upper portion of the sync signal S was eliminated, such as shown by the broken lines, so that non-contractors cannot receive the normal television signal. The pattern of this blanking signal section always has the same shape or envelope irrespective of the content of the video information signal section and the relationship between the amplitude of the blanking signal waveforms and the time is generally and very preferably managed. Therefore, when the pattern of this blanking signal section is considered as the two-dimensional pattern consisting of the amplitude and time directions, there is a strong correlation. It is possible to obtain the timing information of the sync signal from the shape of the blanking signal section by utilizing this correlation. That is, a matched filter may be used as means for realizing this method of obtaining such information.

The elastic surface wave filter is widely known as a transversal filter for high frequencies in which the phase and amplitude can be independently designed, and its characteristic is determined on the basis of only the electrode shape of the interdigital electrode in the filter. If the electrode shape of the interdigital electrode is analogous to the waveforms of at least portion of the scrambled blanking signal section, the timing information as a sync signal can be extracted from the blanking signal section which is cyclically generated. In this case, a problem will occur with respect to the selection of the portion of such waveforms as shown in FIG. 5; however, in case of the embodiment of the present invention, the whole section D of the blanking signal section from a start point 18 to an end point 19 of the blanking signal section is selected. This selection enables the feature the blanking signal section to be more clarified, so that the probability of malfunction is small.

Figure 6:
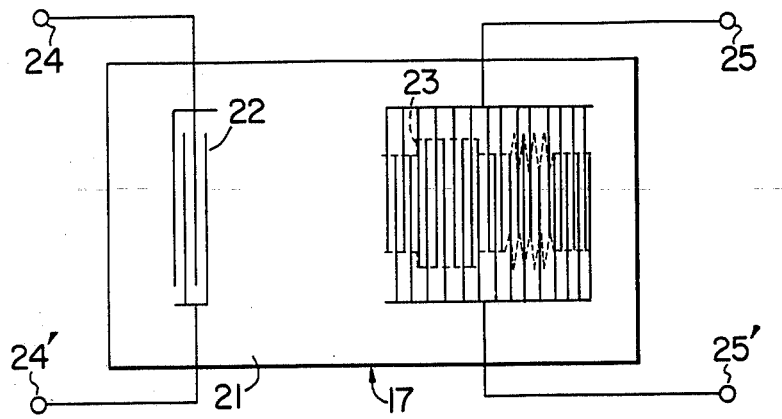
FIG. 6 is a schematic diagram showing an embodiment of the elastic surface wave filter to be used in the descrambling apparatus according to the present invention.

In the embodiment of the present invention, an elastic surface wave filter 17 used as a matched filter was manufactured under the following conditions with such a construction as shown in FIG. 6. A single crystal of bismuth silicon oxide ($Bi_{12}SiO_{20}$) of the (1 0 0) plane is used as a piezoelectric substrate 21, and the propagating direction of the elastic surface waves is set into <1 1 0> axis. The input interdigital electrode 22 has five pairs of unapodized electrode fingers of a wide band characteristic at the center frequency of 45 MHz. In addition, the output interdigital electrode 23 is constituted as 450 pairs of apodized electrodes in which the cross width L and the cycle Δ or pitch of the electrodes are changed in accordance with the waveforms of at least portion of the specific waveforms which are cyclically generated, such as the luminance signal section LU.

In the elastic surface wave filter 17 of FIG. 6, pulse-like response signals are output from the output terminals 25 and 25' only when the electric signal similar to the electrode pattern of the output interdigital electrode 23 was input from input terminals 24 and 24'.

Figure 3:
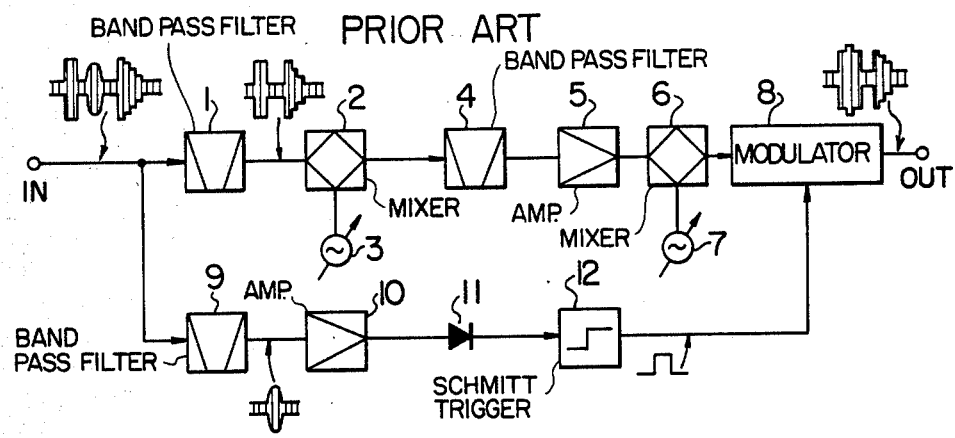
FIG. 3 is a circuit diagram showing a conventional scrambling apparatus.
Figure 7:
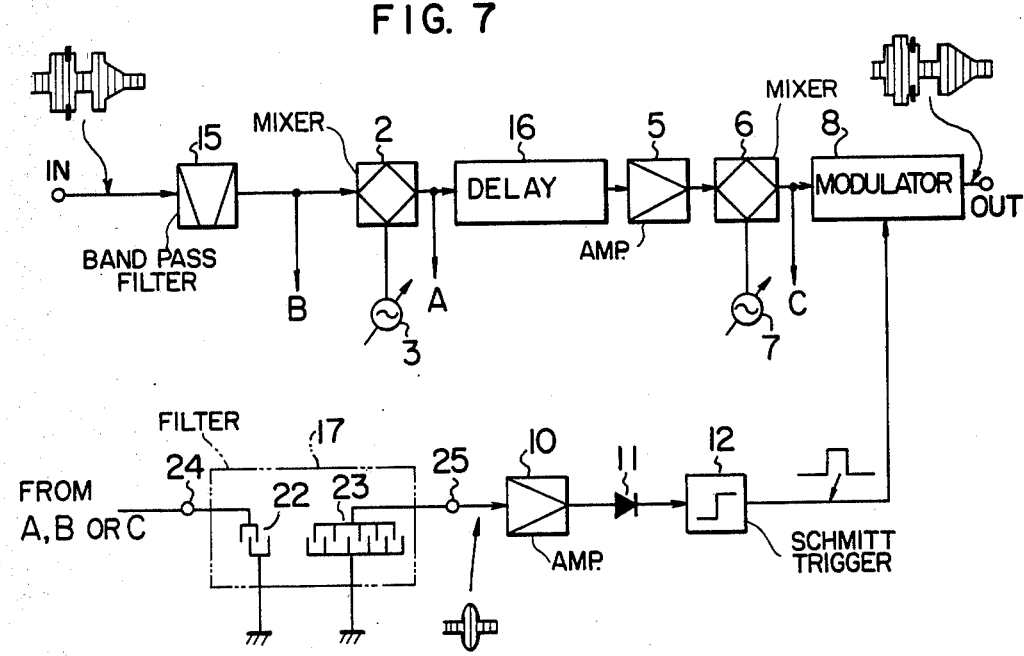
FIG. 7 is a circuit diagram showing one embodiment of the descrambling apparatus according to the present invention.

FIG. 7 is a circuit diagram showing one embodiment according to the present invention. In the diagram, the same blocks as or blocks corresponding to those shown in FIG. 3 are designated by the same reference numerals. A reference numeral 15 denotes a BPF for simply eliminating the spurious; 16 is a delay circuit for adjusting the delay time; and 17 is the elastic surface wave filter whose electrode pattern shape is similar to the scrambled waveforms to be input, and which outputs a response signal only when the scrambled waveforms were input.

The essence of the operation of the circuit shown in FIG. 7 will now be described. In this case, the frequency band may be narrow as scrambled waveforms to be input since it is not necessary to include the pilot signal which occupies the special frequency band.

Such scrambled waveforms are input through the input terminal IN to the BPF 15 for elimination of the spurious. After the spurious has been eliminated, the waveforms are input as a signal to be modulated to the modulator 8 through the primary mixer 2, delay circuit 16, amplifier 5, and secondary mixer 6 in the same manner as in case of the circuit operation of FIG. 3.

On the other hand, the scrambled waveforms from which the spurious has been eliminated are input from a terminal A to the elastic surface wave filter 17, and the filter 17 then outputs an impulse signal. This impulse signal is input as a modulation signal to the modulator 8 through the amplifier 10, detector 11, and Schmitt trigger circuit 12 in the same manner as the case of the circuit operation of FIG. 3. The modulator 8 adds the sync signal to the blanking signal in the same manner as the case of the circuit operation of FIG. 3 and can output the descrambled waveforms.

Although, in this embodiment, the input of the elastic surface wave filter was extracted after the primary mixer 2 (at A in FIG. 7), it may be extracted from the front stage (at B in the diagram) of the mixer 2 or from the rear stage (at C in the diagram) of the secondary mixer 6.

However, in the case where it was extracted from point B, the frequency has to be set from the CATV channel of 54–300 MHz since the input frequencies to the elastic surface wave filter 17 are different for every receiving channel. In such a case, the multichannel pay television can be easily realized. On one hand, in the case where the input was extracted from point C, it is necessary to switch the output RF channels (2 Channel or 3 Channel in case of U.S.A.).

In case of the present embodiment, although the chip length of the elastic surface wave filter 17 is about 25 mm, if one desires to further miniaturize it, it is also possible to shorten the chip length to about ¼ of the above-mentioned length if the waveforms D' from the portion (20 in FIG. 5) near the trailing portion of the basic section P of the horizontal sync signal to the portion (21 in FIG. 5) near the start point of the color burst CB are expressed by the interdigital electrode 23 instead of expressing the entire luminance signal waveforms D (from 18 to 19 in FIG. 5) in the retrace time of about 12 μs as in the present embodiment by the interdigital electrode.

Figure 1:
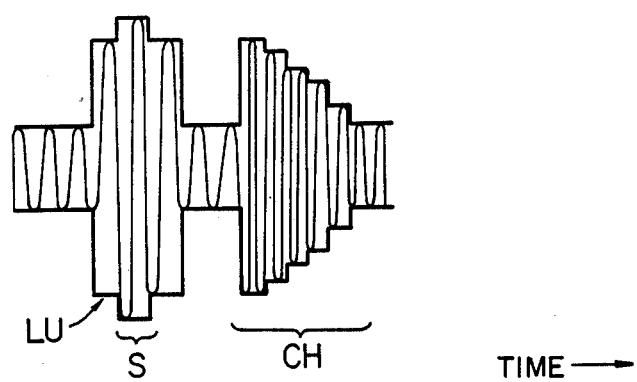
FIG. 1 is a diagram showing an example of the waveforms of a television signal in the case where it is not scrambled.
Figure 2:
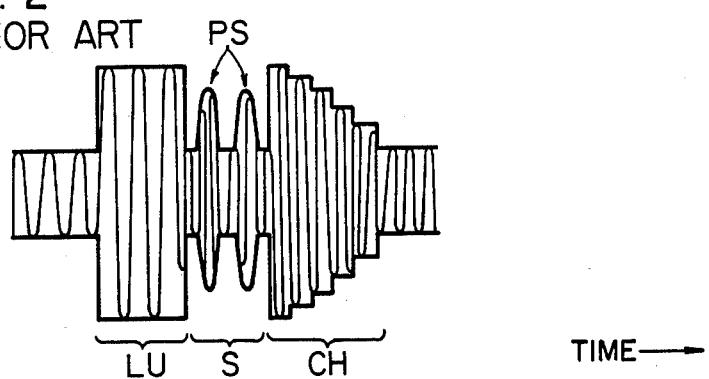
FIG. 2 is a diagram showing the waveforms of the scrambled television signal to be used in a conventional pilot carrier method.

Furthermore, in case of the present embodiment the elastic surface wave filter utilizes the blanking signal section of the scrambled television signal. However, if the scrambled signal is created by adding such a pilot signal PS as shown in FIG. 2 between the blanking and video information signal sections without using another frequency band, it is possible to perform a similar descrambling using the interdigital electrode which has an electrode pattern similar to at least portion of the shape of that pilot signal.

According to the present invention, the descrambling is made possible without using the pilot carrier signal in another frequency band different from the video carrier frequency; therefore, a necessary frequency band width may be narrow, so that there is an advantage in that the multichannel of the broadcasting channel can be realized due to this.

We claim:

1. An apparatus for descrambling a scrambled television signal in which the scrambling has been effected by modifying a cyclically generated signal section to have a particular multi-level shape, comprising:
    input means for inputting the scrambled television signal;
    filter means, connected to said input means, for generating a response signal only when each level of a multi-level portion of a waveform having said particular shape of said cyclically generated signal section of the scrambled television signal received from said input means is detected; and
    conversion means for converting the scrambled signal in response to said response signal of said filter means into a descrambled television signal.

2. A descrambling apparatus according to claim 1, wherein said filter means is an elastic surface wave filter having an interdigital electrode structure with a pattern shape similar to at least a portion of the waveforms of said signal section of particular multi-level shape of said scrambled television signal.

3. A descrambling apparatus according to claim 2, wherein the pattern shape of said interdigital electrode is analogous to at least a portion of a luminance signal section which is cyclically generated in said scrambled television signal.

4. A descrambling apparatus according to claim 1, wherein said conversion means includes means for inputting said scrambled television signal as a signal to be modulated and for utilizing the response signal from said filter means as modulation for said signal.

* * * * *